April 25, 1950   G. KORINEK   2,505,675
FILING MACHINE
Filed May 6, 1946   2 Sheets-Sheet 2
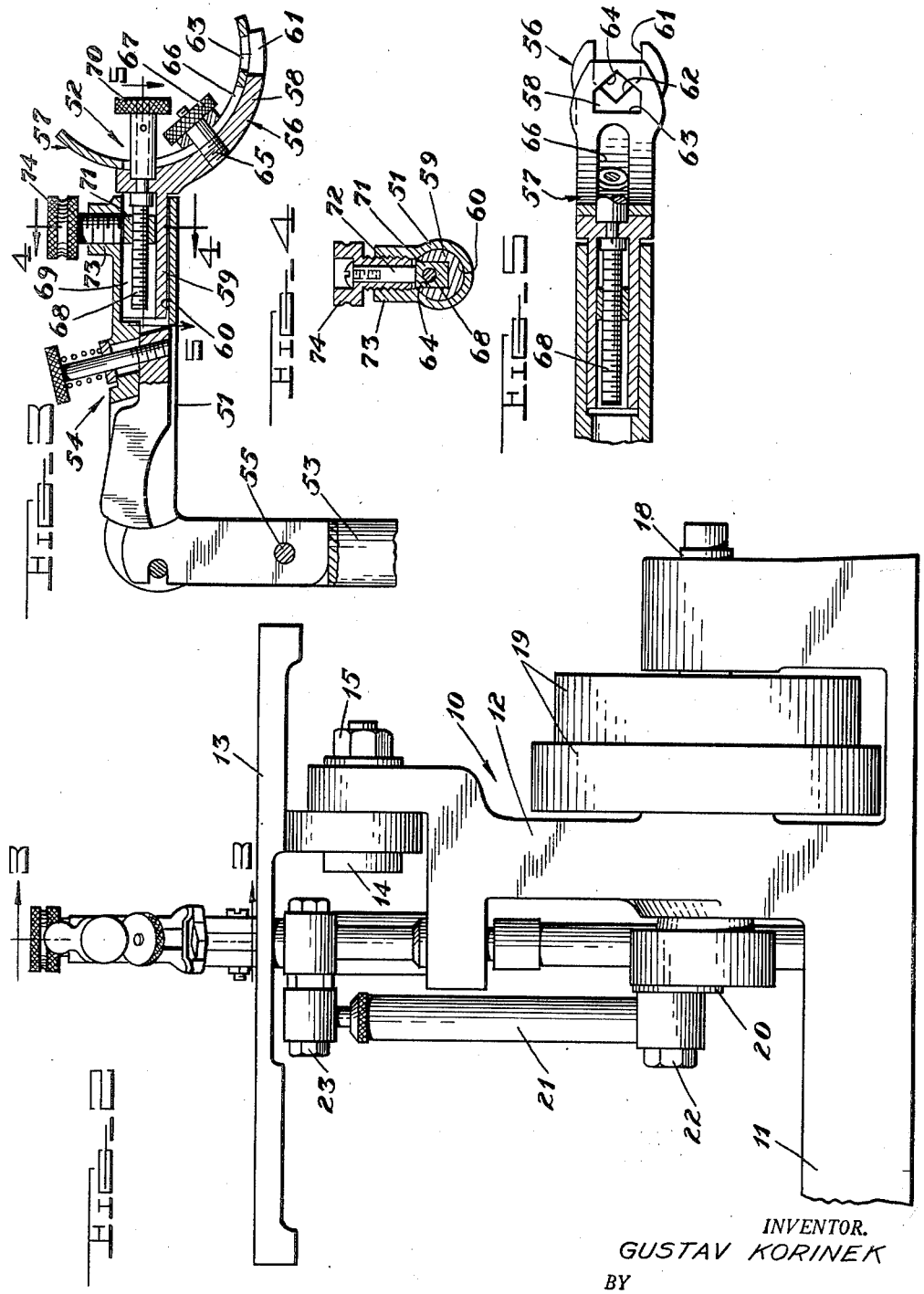
INVENTOR.
GUSTAV KORINEK
BY
ATTORNEYS Patented Apr. 25, 1950

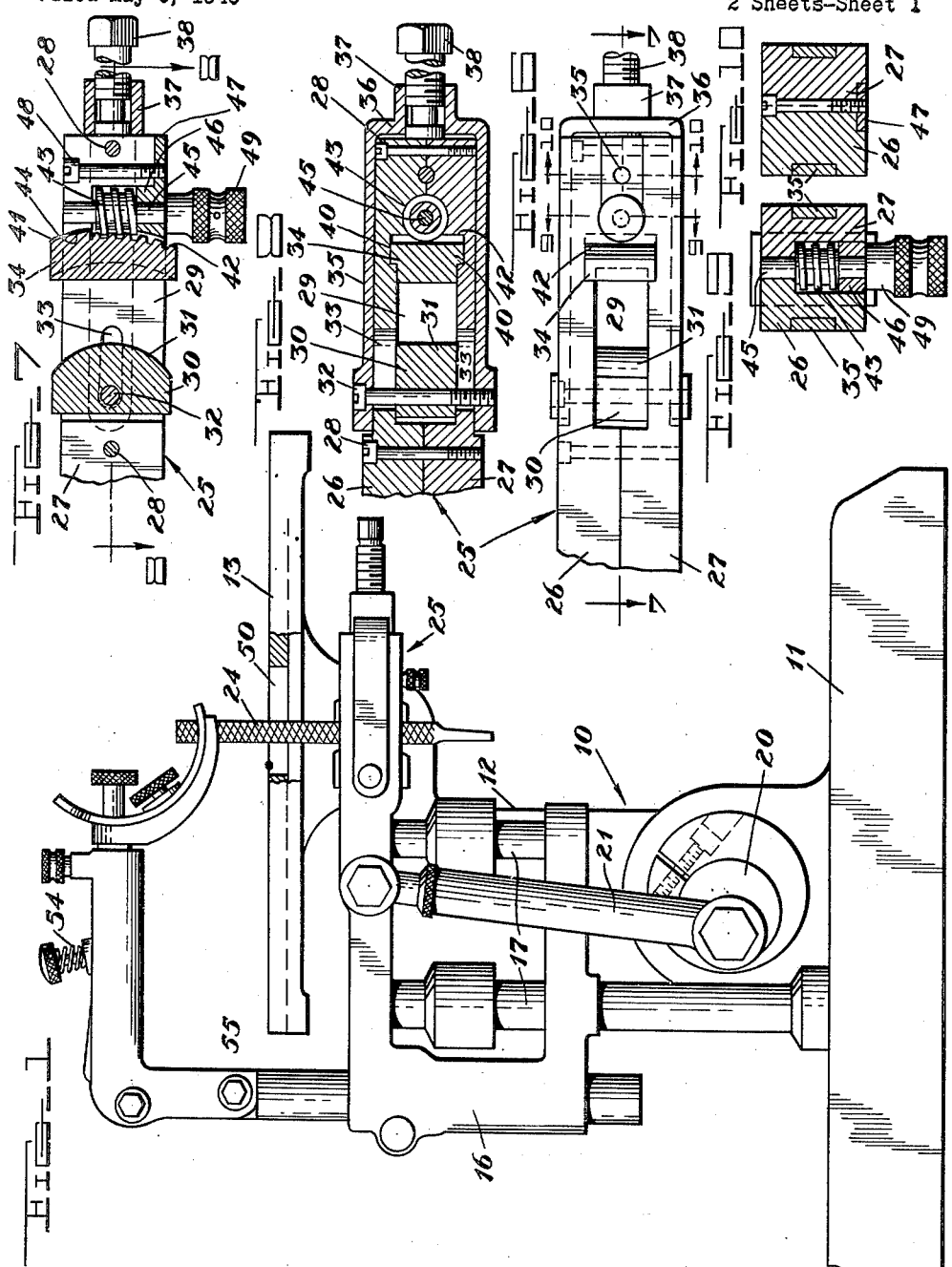

2,505,675

UNITED STATES PATENT OFFICE 2,505,675

FILING MACHINE

Gustav Kořínek, Detroit, Mich.

Application May 6, 1946, Serial No. 667,542

5 Claims. (Cl. 29—76)

This invention relates generally to machine tools of the type having a tool reciprocable through an opening in a work supporting table.

The invention concerns itself more particularly with filing machines of the type wherein the file is reciprocated through an opening provided in the work supporting table and has as one of its objects to provide improved means for rigidly supporting the file at opposite sides of the table to enable accurately fashioning the work supported on the table.

Another object of this invention is to provide means for adjusting the supporting means to enable accurately positioning the file in various angular positions relative to the supporting table, so that work may be accurately formed to predetermined contours.

Still another feature of this invention is to provide a holder for the portion of the file below the work supporting table constructed to secure the file in various different angular positions with respect to the table and having adjustable means enclosed in a manner to exclude filings, chips or other foreign matter.

A further object of this invention is to provide means above the work supporting table for removably supporting the upper end portion of the file and having provision for engaging files of various different cross sectional areas.

The foregoing as well as other objects will be made more apparent as this description proceeds, especially when considered in connection with the accompanying drawings, wherein:

Figure 1 is a side elevational view of a filing machine embodying the features of this invention;

Figure 2 is an end elevational view of the machine shown in Figure 1;

Figure 3 is a fragmentary side elevational view partly in section of the file clamping means provided above the work supporting table;

Figure 4 is a sectional view taken substantially on the plane indicated by the line 4—4 of Figure 3;

Figure 5 is a plan view partly in section of the construction shown in Figure 3;

Figure 6 is a fragmentary plan view of the tool holder provided below the work supporting table;

Figure 7 is a sectional view taken on the plane indicated by the line 7—7 of Figure 6;

Figure 8 is a sectional view taken on the line 8—8 of Figure 7; and

Figures 9 and 10 are respectively cross sectional views taken on the lines 9—9 and 10—10 of Figure 6.

Referring now more in detail to the drawings, it will be noted that the reference character 10 indicates a filing machine having a base 11 and having a pedestal 12 extending upwardly from the base. A work supporting table 13 is supported on the upper end of the pedestal 12 for rocking movement by a pin or bolt 14 having a nut 15 for clamping the table in any one of various angular positions of adjustment relative to the pedestal 12.

A tool operating device 16 is supported on the base 11 beneath the work supporting table 13 for vertical sliding movement. This device is guided throughout its vertical travel by a pair of cylindrical posts 17 supported by the base 11. In the present instance the device 16 is operated by a drive shaft 18 journalled in any suitable manner on the base 11 and having pulleys 19 secured thereto to enable connecting the shaft to a suitable prime mover, not shown. The rotatable drive shaft 18 is operatively connected to the device 16 by an eccentric 20 and a connecting rod 21. The eccentric 20 is rotatable as a unit with the shaft 18 and is secured to the lower end of the connecting rod by a stud 22. The upper end of the connecting rod is secured to the device 16 by a stud 23 with the result that rotation of the eccentric by the shaft 18 effects a reciprocation of the device 16 on the vertical guides 17.

The tool to be operated is indicated in Figure 1 of the drawings by the reference character 24, and in the present instance, comprises an elongated file. The lower end of the file 24 is connected to the device 16 by a tool holder 25. The tool holder comprises an arm composed of two sections 26 and 27 secured in juxtaposition to each other by studs 28. The adjacent surfaces of the sections 26 and 27 are formed with registering recesses providing an elongated slot 29 through which the tool 24 is adapted to extend. Positioned in the slot 29 at the inner side of the tool 24 is a clamping member 30 having an arcuate outer surface 31 and secured in the slot 29 by a stud 32. As shown particularly in Figure 8 of the drawings, the stud 32 projects transversely through elongated slots 33 formed in the sections 26 and 27 at opposite sides of the slot 29. The slots 33 are parallel to the slot 29 and permit sliding movement of the clamping member 30 toward and away from a cooperating clamping member 34 to clamp the tool therebetween. The opposite ends of the stud 32 are anchored in the free ends of a yoke 35 which straddles the sections of the arm and has the base portion 36 positioned beyond the outer end of the sectional arm. The base portion 36 is provided with a boss 37 having a bore therethrough internally threaded for threadably engaging an adjusting screw 38. The inner end of the adjusting screw 38 is adapted to abut the outer end of the sectional arm and cooperates with the latter to move the clamping member 31 toward and away from the clamping member 34 upon rotation of the adjusting screw 38 in opposite directions.

The clamping member 34 is supported in the slot 29 for movement in an arcuate path substantially concentric with the arcuate surface 31 on the clamping member 30 and is guided throughout this path by projections 40 extending outwardly from diametrically opposite sides into recesses respectively formed in opposite walls of the slot 29. The outer face 41 of the clamping member 34 has a radius of curvature which corresponds to the arcuate path of travel of the clamping member, and is formed with teeth 42 which mesh with a worm 43. It is pointed out at this time that the teeth 42 terminate short of the upper end of the member 34, and that the upper portion of the surface 40 has a sliding contact with the adjacent wall 44 of the slot 29. As a result, the worm 43 and intermeshing teeth 42 on the clamping member 34 are sealed against entrance of chips, filings or other foreign matter.

The worm 43 is formed on a shaft 45 having the upper end journalled in a bore formed by registering recesses in the adjacent surfaces of the sections 26 and 27. The lower end of the shaft 45 is journalled in a bearing 46 formed on a plate 47 which is secured to the underside of the sectional arm by a stud 48. The purpose of this plate is to provide an ample support for the lower end of the worm shaft in the assembled position of the parts. The worm shaft is rotated to adjust the clamping member 34 along its arcuate path of travel by a knob 49 secured to the lower end of the worm shaft 45. The above arrangement is such that the holder 25 not only serves to effectively clamp the tool 24 to the device 16, but also permits varying the angular position of the tool 24 relative to the work supporting table 13.

The work supporting table 13 is formed with an opening 50 therethrough and the upper end of the tool 24 is adapted to project through the opening 50, so that it may be engaged by the work supported on the table. In the present instance, the upper end of the tool 24 is secured to an arm 51 by a clamp 52. The arm 51 is connected to the upper end of a post 53 having the lower end secured to the devise 16 for movement as a unit with the latter. The connnection between the post 53 and arm 51 comprises a releasable latch 54 and a pivot 55. This construction is shown in my Patent No. 1,361,074 dated December 7, 1920, and need not be described in detail herein. It will suffice to point out that the above connection enables the arm 51 to be readily swung to an inoperative position at one side of the work supporting table when desired.

The clamp 52 comprises cooperating parts 56 and 57. The part 56 has a portion 58 which forms a segment of a circle and has a cylindrical portion 59 which slidably engages in a bore 60 formed in the outer end of the arm 51. The part 57 corresponds in curvature to the portion 58 and slidably engages the latter. As shown particularly in Figure 5 of the drawings, the lower end of the portion 58 is formed with a slot 61 having a V-shaped base portion 62, and the corresponding end of the part 57 is formed with a slot 63 having a V-shaped outer wall 64. The slot 63 in the part 57 is registerable with the slot 61 in the part 56, and the V-shaped walls of the slots cooperate to clamp the upper end of the tool 24. It will also be noted that the V-shaped walls of the slots are effective to clamp tools of various different cross sectional contours, and that the size of the tool may be compensated for by adjusting the part 57 relative to the part 56. In the present instance, this adjustment is rendered possible by clamping the parts together with a stud 65 having the lower end secured to the portion 58 and having the upper end projecting through an arcuate slot 66 in the part 57. A thumb screw 67 is threaded on the upper end of the stud, and is adapted to engage the adjacent side of the part 57 to clamp the latter against the portion 58 of the part 56.

It is also desirable to adjust the clamp 52 fore and aft relative to the arm 51. This is accomplished by providing an adjusting screw 68 and by forming a recess 69 in the cylindrical portion 59 of the part 56 for receiving the inner end portion of the adjusting screw. The outer end portion of the adjusting screw is rotatably supported in the bore formed in the part 56, and a control wheel 70 is secured to the adjusting screw for rotating the latter. The adjusting screw 68 threadably engages a nut 71 supported in the recess 69 against rotation, and having a shank 72 projecting upwardly through a boss 73 on the arm and secured to a screw 74. The screw 74 is threaded in the boss 73 and serves to tension the screw 68 to hold the latter in any one of its various adjusted positions. Thus, it will be noted that the clamp 52 may not only be adjusted to accommodate tools of different cross sectional areas and of different sizes, but may also be adjusted to compensate for different angular positions of the tool relative to the table.

What I claim as my invention is:

1. A filing machine comprising a tool holder having cooperating clamping members engageable with opposite sides of a tool to clamp the same to the holder, one of the members having an arcuate face engageable with one side of the tool to permit rocking movement of the tool relative to the holder, means supporting the other of said members for sliding movement along a path curved in such relation to the arcuate face on said one member to rock said tool about the arcuate face upon sliding movement of the said one member, and means connected to said one member for sliding the same along said arcuate path.

2. A filing machine comprising a tool holder having cooperating clamping members relatively movable toward and away from each other, means for moving one member in a direction toward the other to clamp a tool therebetween, said one member having an arcuate face engageable with one side of the tool, means supporting the other member for sliding movement along an arcuate path for rocking the tool about the arcuate face on said one member, and means for moving the said other member along said arcuate path while the tool is clamped between said members.

3. A filing machine comprising a tool holder having a slot through which a tool is adapted to extend and having members in said slot for engaging opposite sides of the tool, one of said members having an arcuate tool engaging face permitting rocking movement of the tool in a plane including the tool, means supporting the other member for movement in said plane along an arcuate path generally concentric with the arcuate tool engaging face on the said one member, and means for moving the said other member along the arcuate path aforesaid to angularly adjust the position of the tool relative to the holder.

4. A filing machine comprising a tool holder having cooperating clamping members relatively movable toward and away from each other, means for moving one member in a direction toward the other to clamp a tool therebetween, said one member having an arcuate face engageable with one side of the tool, means supporting the other member for movement along an arcuate path for rocking the tool about the arcuate face on said one member, and means for moving the said other member along said arcuate path including a worm meshing with teeth on said other member.

5. A filing machine comprising a tool holder having cooperating clamping members relatively movable toward and away from each other, means for moving one member in a direction toward the other to clamp a tool therebetween, said one member having an arcuate face engageable with one side of the tool and the other member also having an arcuate face opposite the tool engaging face thereof, means supporting the said other member for movement along a path concentric with the arcuate face thereon, and means for moving the said other member along said arcuate path to rock the tool about the arcuate face on the said one member including a rotatable worm meshing with teeth on the arcuate face of the said other member.

GUSTAV KOŘÍNEK.

REFERENCES CITED

The following references are of record in the file of this patent:

UNITED STATES PATENTS

| Number | Name | Date |
| --- | --- | --- |
| 888,651 | Peterson | May 26, 1908 |
| 950,792 | Korinek | Mar. 1, 1910 |
| 1,369,138 | Skinner | Feb. 22, 1921 |
| 1,395,381 | Biddle | Nov. 1, 1921 |
| 1,412,915 | Boker | Apr. 18, 1922 |
| 1,636,729 | Yarrington | July 26, 1927 |
| 2,327,843 | Jesionowski | Aug. 24, 1943 |